W. E. WOODARD.
LOCOMOTIVE TRAILING TRUCK.
APPLICATION FILED MAR. 6, 1914.
1,101,227.
Patented June 23, 1914.
3 SHEETS—SHEET 2.
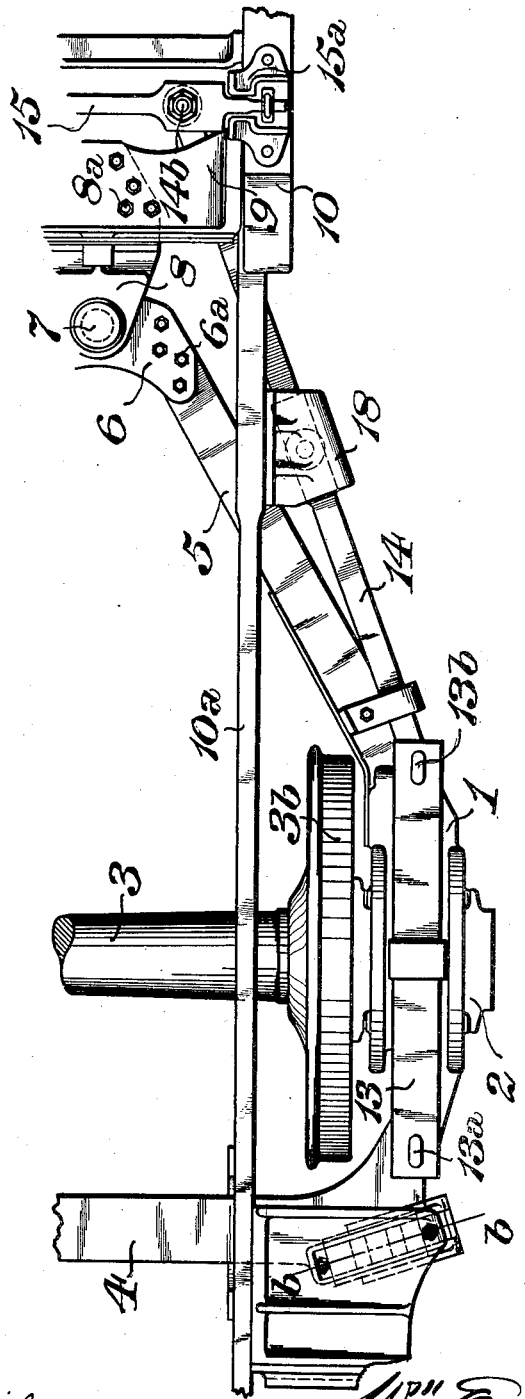
WITNESSES:
Edward A. Wright
S. R. Bell.
INVENTOR.
Wm. E. Woodard
by J. Snowden Bell,
ATTORNEY.

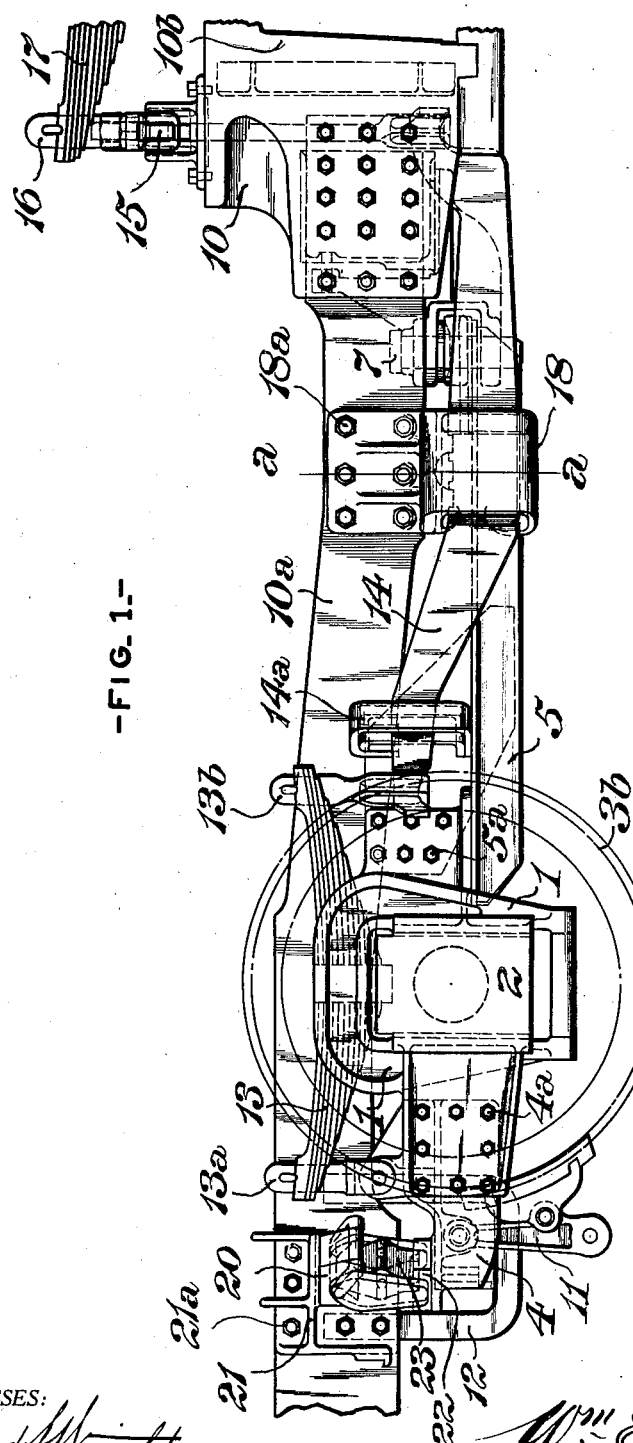

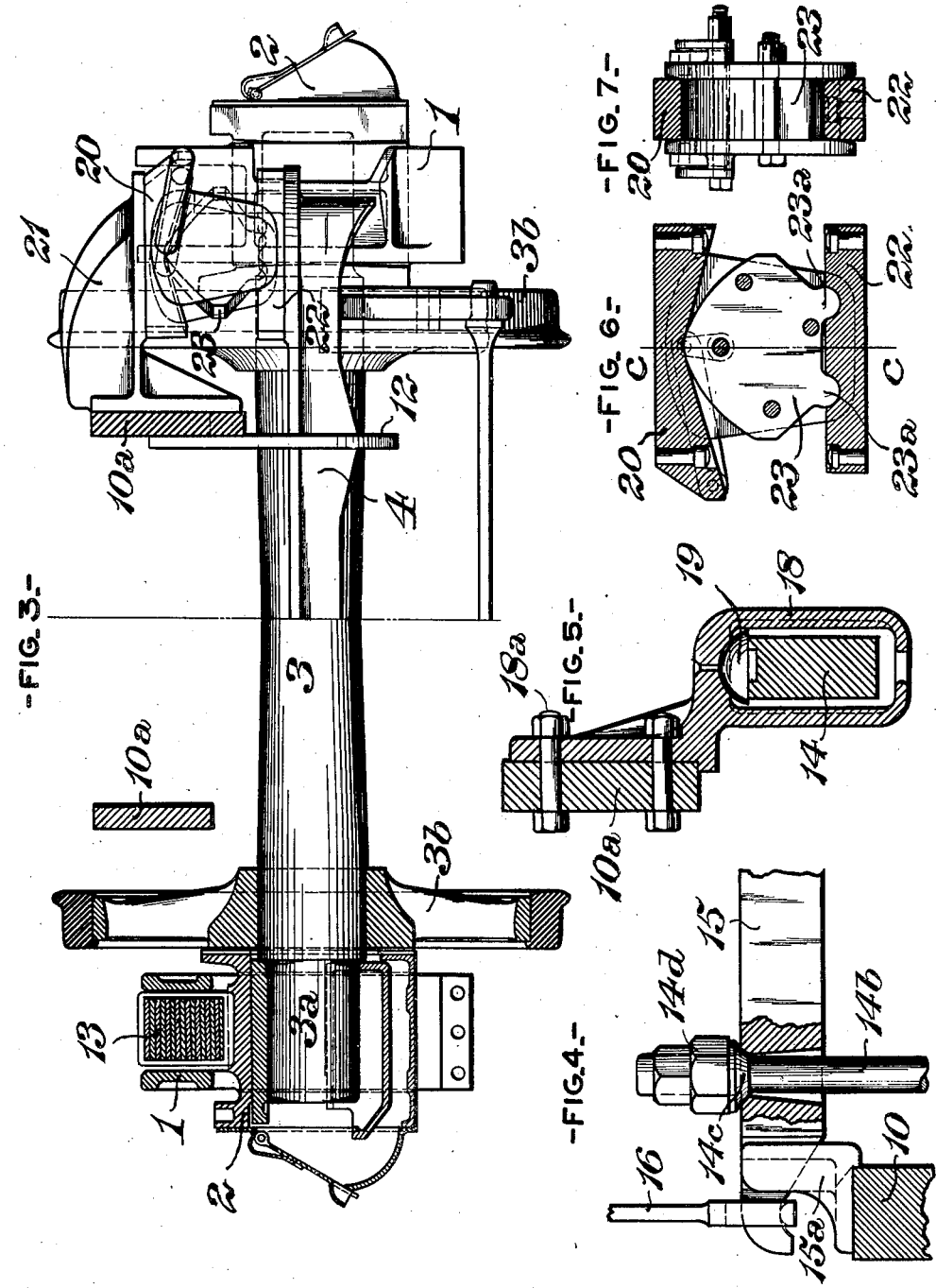

UNITED STATES PATENT OFFICE.

WILLIAM E. WOODARD, OF SCHENECTADY, NEW YORK.

LOCOMOTIVE TRAILING-TRUCK.

1,101,227.  Specification of Letters Patent.  Patented June 23, 1914.

Application filed March 6, 1914. Serial No. 822,994.

*To all whom it may concern:*

Be it known that I, WILLIAM E. WOODARD, of Schenectady, in the county of Schenectady and State of New York, have invented a certain new and useful Improvement in Locomotive Trailing-Trucks, of which improvement the following is a specification.

My invention relates to outside journal radial trailing trucks for locomotives, and its object is to provide, in a truck of such type, simple, inexpensive, and positive centering means, by which sliding surfaces and centering springs are dispensed with; and which embodies a continuous equalizer system from the driving spring equalizers to the rear connections of the truck springs, by which the latter may be shortened and located nearer to the wheels and greater vertical clearance afforded, and the transfer of weight between the truck frame and the main frame of the locomotive, be effected at points directly adjacent to and in rear of the back ends of the truck springs.

The improvement claimed is hereinafter fully set forth.

In the accompanying drawings: Figure 1 is a side view, in elevation, of a locomotive trailing truck, illustrating an embodiment of my invention; Fig. 2, a half plan view of the same; Fig. 3, a view, the left hand half of which is a vertical transverse section in the plane of the truck axle, and the right hand half, a rear elevation; Fig. 4, a side view, partly in section, and on an enlarged scale, of a portion of the upper cross equalizer; Fig. 5, a vertical transverse section, on a similar scale, through a truck equalizer, and its support, on the line *a a* of Fig. 1; Fig. 6, a vertical longitudinal section through the bearings of one of the rockers, on the line *b b* of Fig. 2; and, Fig. 7, a vertical transverse section through the same, on the line *c c* of Fig. 6.

Referring to the drawings, my invention is herein exemplified as applied in a two wheeled radial locomotive trailing truck, the frame of which is substantially triangular in plan, and comprises two pedestal members, 1, each of which constitutes part of one side of the frame, and is formed with vertical jaws, between which is fitted one of the journal boxes, 2, in which the journals, 3ª, of the truck axle, 3, rotate, said axle having truck wheels, 3ᵇ, secured upon it, in the usual manner. The pedestal members are connected one to the other, at their rear ends, by a transverse rear frame member, 4, to the forwardly projecting ends of which they are secured by bolts, 4ª, and the frame is completed by two radius bar members, 5, the rear ends of which are secured by bolts, 5ª, to the forward jaws of the pedestal members, and which extend forwardly and inwardly therefrom to a center pin socket, 6, to which they are secured by bolts, 6ª. The center pin socket is coupled, by a center pin, 7, to a bracket, 8, secured by bolts, 8ª, to a cross tie, 9, connected, at its ends, to the side frames, 10, of the locomotive on which the truck is applied. The rear frame member is provided with suitable lugs for the connection of brake hangers, 11, and is fitted to swing transversely on U shaped straps, 12, bolted to and depending from the supplemental rear members, 10ª, of the main locomotive frames.

The portion of the weight of the locomotive which is carried by the truck, is supported on the axle, 3, through the intermediation of springs, 13, which bear directly on the crowns of the journal boxes, 2, and move laterally with them and with the truck frame. The rear ends of the springs, 13, are coupled to the rear frame members, 4, by rear spring hangers, 13ª, and the front end of each of the springs is coupled, by a front spring hanger, 13ᵇ, to the rear end of one of a pair of truck equalizers, 14, each of which is pivoted on the adjacent supplemental rear locomotive frame member, 10ª, as hereinafter described, and which extends forwardly and inwardly. The rear ends of the equalizers are fitted to work in guides, 14ª, which are secured to the radius bar members, 5, of the truck frame, and by which the equalizers are maintained in proper relation to the front ends of the springs, and the front ends of the equalizers are coupled to the lower ends of vertical hangers, 14ᵇ, the upper ends of which are, in turn, coupled to a transverse locomotive spring equalizer, 15, extending across the main frames, 10, behind the rearmost pedestal jaws, 10ᵇ, thereof. The equalizer, 15, is coupled, by hangers, 16, to the springs, 17, of the rear driving axle of the locomotive. Instead of being connected to the locomotive frame members by pin bearings as in ordinary practice, the truck equalizers, 14, are pivoted thereon by ball or universal joints, which permit movement of the equalizers in both vertical and horizontal planes, within the range of the movement of the truck about the axial line of the center pin, 7. For this purpose, bearing brackets, 18, are secured, by bolts, 18ª, to the supplemental rear locomotive frame members, 10ª, said bearing brackets extending around the truck equalizers, 14, and being suitably recessed to fit and rest on universal joint bearings, 19, which are in the form of segments of spheres, and are fitted in recesses in the tops of the equalizers, as shown in Fig. 5, a plurality of recesses being provided in each equalizer, to enable adjustments of the weight on the truck to be made, if necessary, after the construction of the locomotive. In order to admit of such movement of the lower ends of the forward hangers, 14ᵇ, of the truck equalizers, as may be required by the lateral movements of the truck frame, spherical faced bearings, 14ᵉ, are, as shown in Fig. 4, fitted on said hangers, adjacent to their upper ends, said bearings fitting in corresponding seats on the transverse equalizer, 15, and being held in position on the hangers by nuts, 14ᵈ. The openings in the equalizer, 15, through which the hangers, 14ᵇ, pass, are in the form of a frustum of a cone, the major diameter of which is at the bottom of the equalizer, thereby permitting any required degree of angular movement of the hangers from their normal vertical positions. Lateral movement of the equalizer, 15, under the influence of vertical angularity of the hangers, 14ᵇ, is prevented by guides, 15ª, secured to the main frame members, 10, between the jaws of which guides, the equalizer, 15, is fitted, adjacent to its ends.

The ordinary means of providing the necessary resistance to the lateral movements of radial trucks, and returning them to normal central position in passing from a curve to a tangent of the track, consists in a centering spring mechanism interposed between the truck frame and the main frame. This construction is subject to the objection, in practical service, of liability to disarrangement from failure of the springs or connecting members. To obviate this objection, as well as to provide a resistance to the lateral movements of the trailing truck which is automatically proportioned to the weight which it carries, my present invention substitutes for the usual centering spring mechanism, a gravity centering mechanism, the preferred form of which, as shown in the drawings, accords in principle with that of the swing bolster centering mechanism set forth in Letters Patent of the United States No. 1,060,222, granted and issued to me under date of April 29, 1913. As applied herein, the gravity centering mechanism comprises, on each side of the truck, an upper rocker bearing, 20, which is secured to a bracket, 21, connected by bolts, 21ª, to the adjacent supplemental rear locomotive frame member, 10ª; a lower rocker bearing, 22, secured to the rear truck frame member, 4; and an interposed rocker, 23, having two semi-cylindrical lower journals, 23ª, each fitting a corresponding transverse groove in the lower rocker bearing, 22. The upper faces of the rockers are upwardly and inwardly curved from their ends to their middle planes, and abut against correspondingly inclined or V shaped faces on the lower sides of the upper rocker bearings, 20. The rockers are adapted to swing about the axes of their journals, 23ª, in either direction, in accordance with the movements of the truck frame, to which the inclined bearing faces, under the gravity of the load, oppose a resistance which is at all times positive, and which may be made increasing, decreasing, or constant, by changes in the angle or contour of the bearing surfaces.

It will be obvious that my invention is not limited to the application of the specific form of gravity resistance mechanism above described, which is not, in and of itself, herein claimed as new, and that any other mechanism which permits relative movement, under resistance imposed by gravity, between the truck frame and the locomotive frame, as, for example, roller bearings or sliding plates, may be interposed between said frames, in rear of the truck axle, without departure from the spirit and operative principle of my invention.

The provision of universal joint bearings for the truck equalizers enables a continuous equalizer system to be institued, from the driving spring equalizer to the rear connections of the truck springs, without necessitating the use of sliding seats or fulcrums to admit of the radial movements of the truck. The rear ends of the truck equalizers being held in position by guides on the truck frame, and consequently following the movements of the truck, these equalizers are always maintained in alinement with the forward ends of the truck springs. The construction herein set forth allows the truck springs to be located at a minimum distance outside of the wheels, and also to be made shorter than in the ordinary construction, as no clearance for the swinging of the truck members, relatively to the springs or spring hangers, needs to be provided for. Greater vertical clearance above the tops of the truck springs than is ordinarily practicable, is also admissible, by reason of the fact that the truck springs are set directly on the tops of the journal boxes, and the amount of vertical clearance is minimized.

A substantial advantage of my improved construction obtains from the fact that the transfer of weight between the locomotive and truck frames is effected at points directly adjacent to and in rear of the truck springs. The truck frame is thereby relieved from excessive load, and bearing points are provided for the superstructure of the locomotive at approximately the same transverse centers as the truck springs and adjacent to the rear end of the locomotive, insuring stability of the superstructure by reason of the substantial distance apart at which the bearing points are spaced.

I claim as my invention and desire to secure by Letters Patent:

1. In a locomotive engine, the combination of a main frame, a radial truck frame pivoted thereto, and a gravity centering mechanism interposed between said main and truck frames and adapted to oppose resistance to lateral movements of the truck frame.

2. In a locomotive engine, the combination of a main frame, a radial truck frame pivoted at its front end thereto, an axle and wheels supporting said truck frame, and a gravity centering mechanism interposed between the main and the truck frame, on the rear side of the truck axle, and adapted to oppose resistance to lateral movements of the truck frame.

3. In a locomotive engine, the combination of a main frame, a radial truck frame pivoted thereto, upper and lower rocker bearings fixed to the main and to the truck frame, respectively, and rockers journaled in the lower bearings and abutting on oppositely inclined faces on the upper bearings.

4. In a locomotive engine, the combination of a main frame, a radial truck frame pivoted at its front end thereto, an axle and wheels supporting said truck frame, journal boxes mounted on said axle, springs interposed between said journal boxes and the truck frame, and a gravity centering mechanism through which weight is transmitted from the main frame to the truck frame, in rear of and adjacent to the truck springs.

5. In a locomotive engine, the combination of a main frame, a radial truck frame pivoted thereto, an axle and wheels supporting said truck frame, journal boxes mounted on said axle, springs carried directly on said journal boxes, an equalizer connected to the rear driving wheel springs of the locomotive, truck equalizers coupling the truck springs to said driving wheel spring equalizer, and universal joint bearings on which said truck equalizers are pivoted to the main frame.

6. In a locomotive engine, the combination of a main frame, a radial truck frame pivoted at its front end thereto, an axle and wheels supporting said truck frame, journal boxes mounted on said axle, springs interposed between said journal boxes and the truck frame, an equalizer extending transversely over the main frames and coupled to springs of the locomotive, equalizers coupled to the truck springs and pivoted on the main frame, hangers coupled to the truck equalizers, and universal joint connections between said hangers and the main frame equalizer.

7. In a locomotive engine, the combination of a main frame, a radial truck frame pivoted at its front end thereto, an axle and wheels supporting said truck frame, journal boxes mounted on said axle, springs interposed between said journal boxes and the truck frame, an equalizer extending transversely over the main frames and coupled to springs of the locomotive, equalizers coupled to the truck springs and pivoted on the main frame, hangers coupled to the truck equalizers and main frame equalizer, and guides fixed to the main frame and engaging the main frame equalizer, whereby lateral movements thereof in radial movements of the truck frame are prevented.

WILLIAM E. WOODARD.

Witnesses:
 HERVEY G. PHELPS,
 WILLIAM D. GRANT.